United States Patent
Yoon

(10) Patent No.: US 11,512,776 B2
(45) Date of Patent: Nov. 29, 2022

(54) PARKING APPARATUS FOR VEHICLE

(71) Applicant: Hyundai Transys Inc., Hwaseong-si (KR)

(72) Inventor: Jae Young Yoon, Hwaseong-si (KR)

(73) Assignee: Hyundai Transys Inc., Hwaseong-si (KR)

( * ) Notice: Subject to any disclaimer, the term of this patent is extended or adjusted under 35 U.S.C. 154(b) by 0 days.

(21) Appl. No.: 17/116,471

(22) Filed: Dec. 9, 2020

(65) Prior Publication Data

US 2021/0239212 A1 Aug. 5, 2021

(30) Foreign Application Priority Data

Feb. 4, 2020 (KR) .................. 10-2020-0012983

(51) Int. Cl.
*F16H 63/34* (2006.01)

(52) U.S. Cl.
CPC ..... *F16H 63/3483* (2013.01); *F16H 63/3433* (2013.01)

(58) Field of Classification Search
CPC ............ F16H 63/3483; F16H 63/3433; F16H 63/3416; F16H 63/3408; F16H 63/38; F16H 63/34; B60T 1/005
USPC ..................................................... 192/219.5
See application file for complete search history.

(56) References Cited

FOREIGN PATENT DOCUMENTS

| CN | 207393933 U | | 5/2018 |
| DE | 19820920 | * | 11/1999 |
| DE | 100 45 953 A1 | | 5/2002 |
| DE | 10105637 | * | 8/2002 |
| KR | 10-2009-0062825 A | | 6/2009 |
| KR | 10-2011-0051684 A | | 5/2011 |
| KR | 10-2018-0018023 A | | 2/2018 |
| KR | 1020180076666 | * | 7/2018 |
| KR | 10-1993154 B1 | | 9/2019 |

OTHER PUBLICATIONS

Machine language translation of DE10105637.*
Machine language translation of KR1020180076666.*
Machine language translation of KR1020180018023.*
Office Action dated Jan. 26, 2021 in Korean Application No. 10-2020-0012983.
Office Action dated Sep. 15, 2021 in German Application No. 10 2020 133 350.1.
Office Action dated Jan. 20, 2022 in Chinese Application No. 202011469438.6.

* cited by examiner

*Primary Examiner* — Huan Le
(74) *Attorney, Agent, or Firm* — Saliwanchik, Lloyd & Eisenschenk

(57) ABSTRACT

A parking apparatus for a vehicle may include: a piston moved according to whether hydraulic pressure is introduced; a detent lever rotated by the movement of the piston; a sprag disposed on a rotation path of the detent lever, and locked to the detent lever so as to restrict the rotation of the detent lever; and a driver contacted with the sprag, and configured to transfer rotational power to the sprag.

9 Claims, 8 Drawing Sheets

PARKING APPARATUS FOR VEHICLE

CROSS-REFERENCE TO RELATED APPLICATION

This application claims priority from and the benefit of Korean Patent Application No. 10-2020-0012983, filed on Feb. 4, 2020, which is hereby incorporated by reference for all purposes as if set forth herein.

BACKGROUND

Field

Exemplary embodiments of the present disclosure relate to a parking apparatus for a vehicle, and more particularly, to a parking apparatus for a vehicle, in which a sprag fixes a detent lever using a solenoid, such that a gear shift position can be shifted to a P position after an N position is maintained.

Discussion of the Background

In general, an automatic transmission includes a parking apparatus which locks a parking gear, fixedly mounted on an output shaft, at a P position and maintains the standstill state of a vehicle.

In such a parking apparatus, when a gear shifting lever is shifted to the P position, a parking rod interlocked with the gear shifting lever operates a parking sprag such that a locking part protruding from the parking sprag is inserted into the parking gear and locked to maintain the P position.

On the other hand, when the P position is released, P-position releasing hydraulic pressure is provided, and the sprag maintains the release of the P position with the hydraulic pressure.

In the related art, hydraulic pressure needs to be applied, when the gear shifting lever is shifted to the P position after an N position is maintained. Thus, separate sequence control needs to be performed to apply hydraulic pressure. However, there are difficulties in performing control to implement the safety function of the vehicle. Therefore, there is a need for an apparatus capable of solving the problem.

The related art of the present disclosure is disclosed in Korean Patent Application No. 10-2009-0062825 published on Jun. 17, 2009 and entitled "Parking Sprag and Parking Device for Auto-Transmission of Vehicle Including the Same".

SUMMARY

Various embodiments are directed to a parking apparatus for a vehicle, in which a sprag fixes a detent lever using a solenoid, such that a gear shift position can be shifted to a P position after an N position is maintained.

In an embodiment, a parking apparatus for a vehicle may include: a piston moved according to whether hydraulic pressure is introduced; a detent lever rotated by the movement of the piston; a sprag disposed on a rotation path of the detent lever, and locked to the detent lever so as to restrict the rotation of the detent lever; and a driver contacted with the sprag, and configured to transfer rotational power to the sprag.

The detent lever may include: a detent lever contact part rotated by contact with the piston; and a detent lever body rotated in connection with the rotation of the detent lever contact part, and having a locking pin which is mounted on the detent lever contact part and locked to the sprag so as to restrict the rotation of the detent lever body.

The detent lever may further include a detent spring compressed by the rotation of the detent lever body, and configured to provide an elastic restoring force to the detent lever body.

The sprag may include: a sprag body rotated by the driver; and a locking groove formed in the sprag body, such that the locking pin is locked to the locking groove so as to restrict the rotation of the detent lever body.

The locking groove may be concavely formed in a V-shape, and has a size to seat the locking pin therein.

The sprag may be rotatably mounted on the driver.

The detent lever may include: a detent lever contact part rotated by contact with the piston; and a detent lever body rotated in connection with the rotation of the detent lever contact part, and having a locking groove locked to the sprag.

The detent lever may further include a detent spring compressed by the rotation of the detent lever body, and configured to provide an elastic restoring force to the detent lever body.

The sprag may include: a sprag body rotated by the driver; and a locking pin mounted on an end of the sprag body, and locked to the locking groove so as to restrict the rotation of the detent lever body.

The locking groove may be concavely formed in a V-shape, and has a size to seat the locking pin therein.

In accordance with the embodiment of the present disclosure, the sprag may be disposed on the rotation path of the detent lever, and receive rotational power from the driver and restrict the rotation of the detent lever.

Furthermore, the locking pin of the sprag may be locked to the locking groove of the detent lever, and thus inhibit the rotation of the detent lever during driving of the vehicle, such that the gear shift position is not shifted to the P position.

Furthermore, the locking pin of the detent lever may be locked to the locking groove of the sprag, and thus inhibit the rotation of the detent lever during driving of the vehicle, such that the gear shift position is not shifted to the P position.

DETAILED DESCRIPTION OF THE ILLUSTRATED EMBODIMENTS

Hereinafter, a parking apparatus for a vehicle will be described below with reference to the accompanying drawings through various exemplary embodiments. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
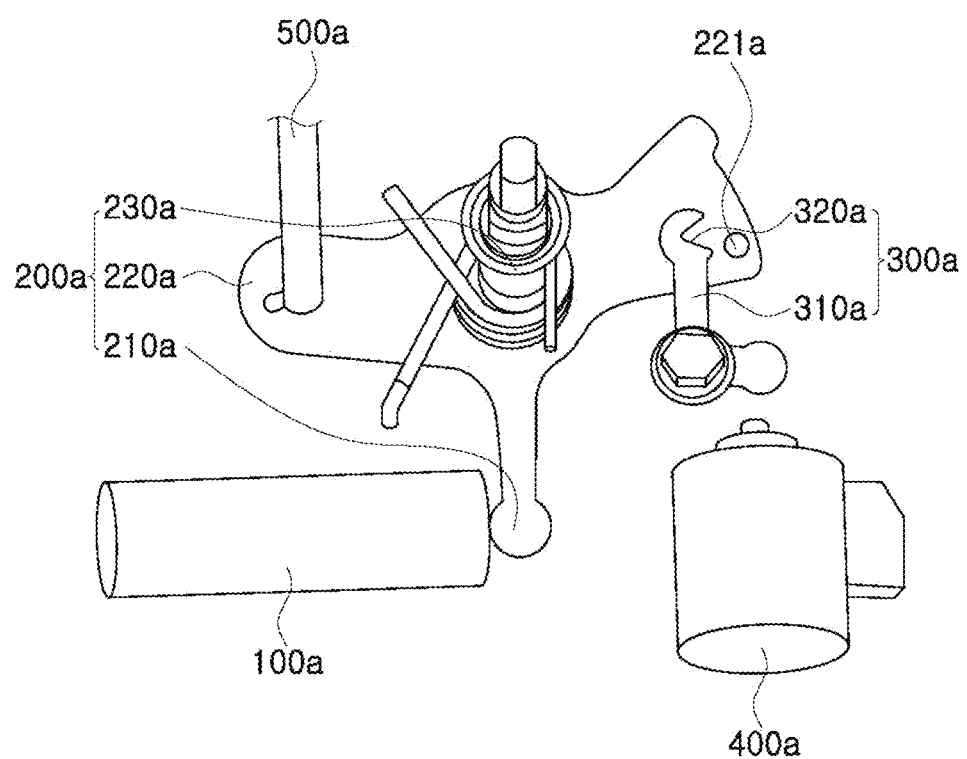
FIG. 1 is a conceptual view schematically illustrating a parking apparatus for a vehicle in accordance with a first embodiment of the present disclosure.
Figure 2:
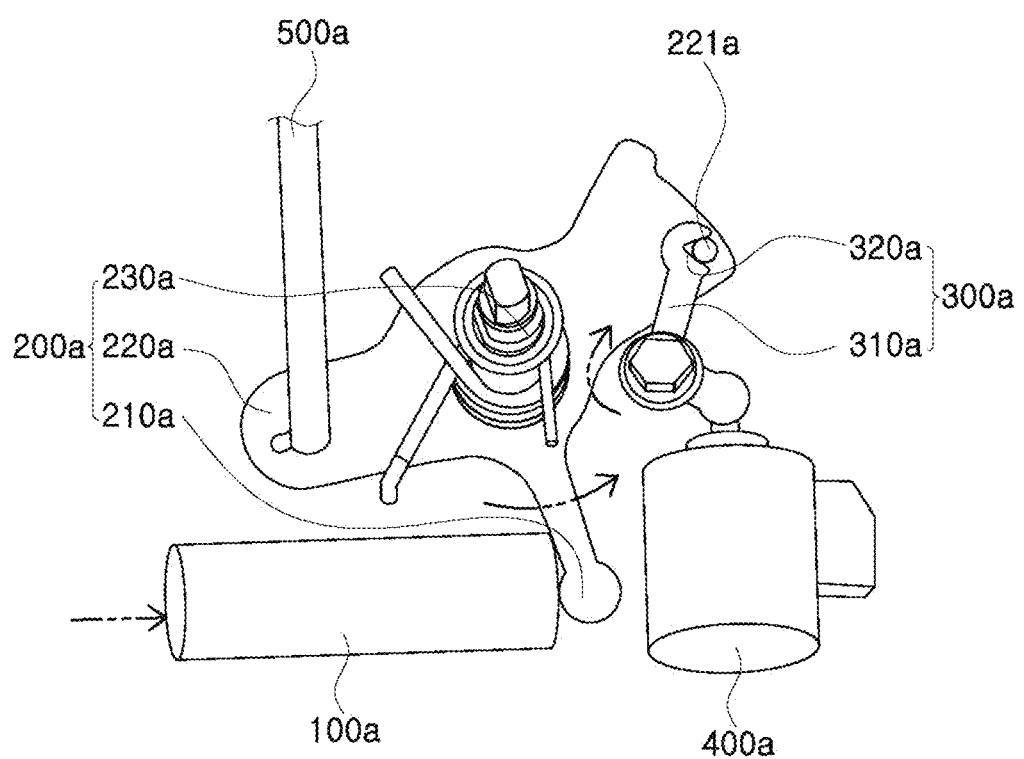
FIG. 2 is a conceptual view schematically illustrating that P-position releasing hydraulic pressure is applied in the parking apparatus for a vehicle in accordance with the first embodiment of the present disclosure.
Figure 3:
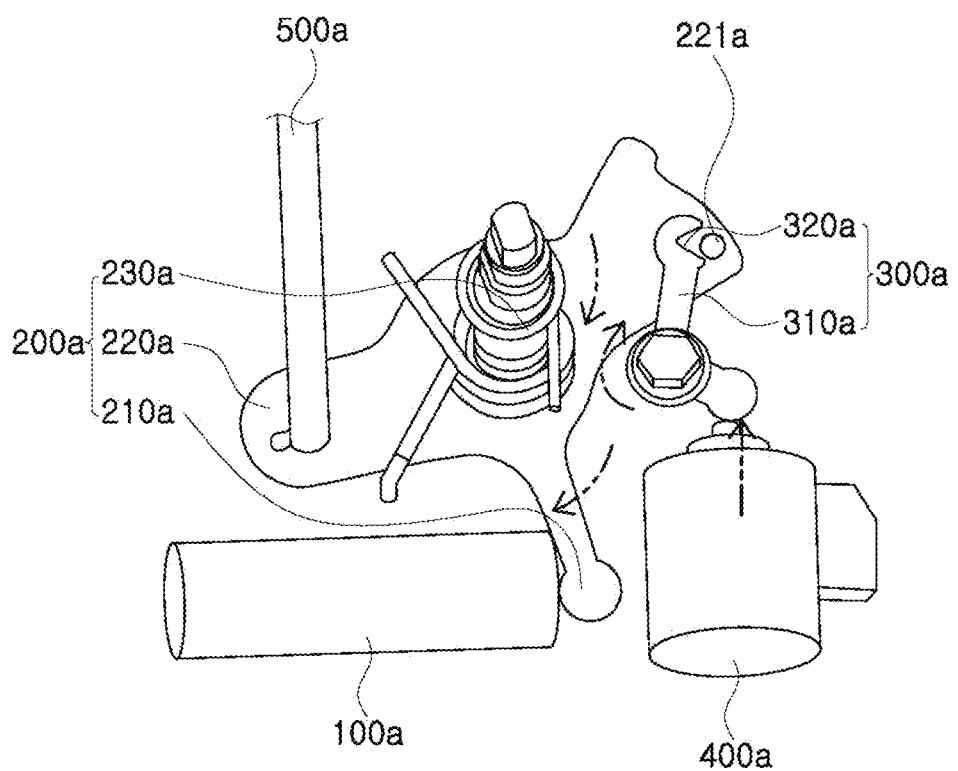
FIG. 3 is a conceptual view schematically illustrating an operation of the parking apparatus for a vehicle in accordance with the first embodiment of the present disclosure when an electromagnetic force of a driver is applied.
Figure 4:
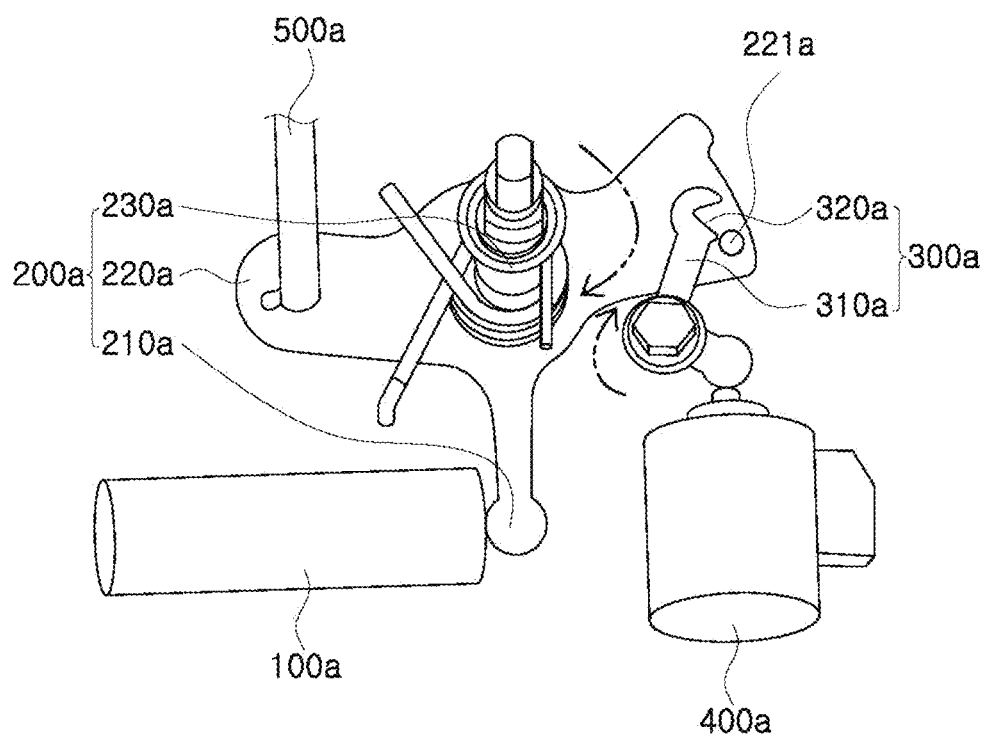
FIG. 4 is a conceptual view schematically illustrating an operation of the parking apparatus for a vehicle in accordance with the first embodiment of the present disclosure when the electromagnetic force of the driver is released.

FIG. 1 is a conceptual view schematically illustrating a parking apparatus for a vehicle in accordance with a first embodiment of the present disclosure, FIG. 2 is a conceptual view schematically illustrating that P-position releasing hydraulic pressure is applied in the parking apparatus for a vehicle in accordance with the first embodiment of the present disclosure, FIG. 3 is a conceptual view schematically illustrating an operation of the parking apparatus for a vehicle in accordance with the first embodiment of the present disclosure when an electromagnetic force of a driver is applied, and FIG. 4 is a conceptual view schematically illustrating an operation of the parking apparatus for a vehicle in accordance with the first embodiment of the present disclosure when the electromagnetic force of the driver is released.

Referring to FIGS. 1 to 4, the parking apparatus for a vehicle in accordance with the first embodiment of the present disclosure includes a piston 100a, a detent lever 200a, a sprag 300a and a driver 400a.

The piston 100a is moved according to whether hydraulic pressure is introduced. The piston 100a is moved in one direction (to the right in FIG. 1) when hydraulic pressure is introduced, and moved in the other direction (to the left in FIG. 1) when the hydraulic pressure is released.

In the present embodiment, the detent lever 200a is rotated by the movement of the piston 100a, and a gear shift position is set to a P position or N position (Non-P position). Hereafter, the N position includes Non-P positions which are not the P position. In the present embodiment, the gear shift position is set to the P position when the detent lever 200a is rotated in the clockwise direction, and set to the N position when the detent lever 200a is rotated in the counterclockwise direction.

In the present embodiment, the piston 100a is operated according to a hydraulic method. However, the present disclosure is not limited thereto, and the operation method of the piston 100a may be modified in various manners. For example, the piston 100a may be operated according to a pneumatic method.

The detent lever 200a is disposed on the moving path of the piston 100a, and rotated in contact with the piston 100a by the movement of the piston 100a. The detent lever 200a includes a detent lever contact part 210a, a detent lever body 220a and a detent spring 230a.

The detent lever contact part 210a is disposed on the moving path of the piston 100a, and contacted with the piston 100a according to the movement of the piston 100a. The detent lever contact part 210a is rotated by contact with the piston 100a.

That is, when the piston 100a is moved in one direction (to the right in FIG. 2) by the introduction of the hydraulic pressure, the detent lever contact part 210a is contacted with the piston 100a. The detent lever contact part 210a is rotated in the counterclockwise direction (based on FIG. 2) according to the movement of the contacted piston 100a.

When the piston 100a is moved in the other direction (to the left in FIG. 2) while the hydraulic pressure of the piston 100a is released, the detent lever contact part 210a is separated from the piston 100a, and rotated in the clockwise direction (based on FIG. 2) by an elastic restoring force of the detent spring 230a.

The detent lever body 220a is rotated in connection with the rotation of the detent lever contact part 210a, and has a locking pin 221a formed on one side (right side in FIG. 1) thereof, the locking pin 221a being locked to a locking groove 320a of the sprag 300.

The locking pin 221a of the detent lever body 220a is locked to the locking groove 320a of the sprag 300a, such that the detent lever body 220a is restricted from rotating. As the locking pin 221a, a bearing or the like may be applied to minimize a frictional force.

The locking pin 221a is mounted on one side (right side in FIG. 1) of the detent lever body 220a, and locked to the locking groove 320a of the sprag 300a so as to restrict the rotation of the detent lever body 220a.

The detent spring 230a is compressed by the rotation of the detent lever body 220a, and provides an elastic restoring force to the detent lever body 220a.

The detent spring 230a may be coupled to the detent lever body 220a, and formed in a coil spring or pin spring shape. The detent spring 230a is held on the detent lever body 220a, and elastically supports the detent lever body 220a in the clockwise direction or counterclockwise direction. Thus, when the gear shift lever is shifted to the P position, the detent spring 230a may assist the movement of the piston 100a.

When the detent spring 230a is to be elastically restored, the locking pin 221a of the detent lever body 220a may be seated in a locking groove 320a of the sprag 300a, such that the detent lever body 220a is more reliably fixed to the sprag 300a. Therefore, the gear shift lever may not be shifted to the P position, but remain at the N position.

In the present embodiment, the detent lever body 220a is contacted with the piston 100a through the detent lever contact part 210a formed on one side (bottom side in FIG. 1) thereof, and the other side (top side in FIG. 1) thereof is coupled to a gear shifting operation part 500a. Thus, the detent lever body 220a may be rotated in connection with the movement of the piston 100a, and transfer power to the gear shifting operation part 500a.

The sprag 300a is rotatably coupled to a vehicle body (not illustrated), disposed on the rotation path of the detent lever 200a, and locked to the detent lever 200a so as to restrict the rotation of the detent lever 200a.

The sprag 300a includes a sprag body 310a and the locking groove 320a. The sprag body 310a is rotated by the driver 400a. The sprag 300a is rotated when an electromagnetic force is applied to the driver 400a, and formed in an L-shape so as to be easily contacted with the detent lever body 220a of the detent lever 200a through the rotation. The sprag body 310a is rotated in the clockwise direction or counterclockwise direction according to whether an electromagnetic force is applied to the driver 400a.

The locking groove 320a is concavely formed at an end (upper end in FIG. 1) of the sprag body 310a, and the locking pin 221a of the detent lever body 220a is locked to the locking groove 320a to restrict the rotation of the detent lever body 220a.

In the present embodiment, the sprag 300a is rotatably mounted on the driver 400a. More specifically, the sprag body 310a of the sprag 300a is rotatably mounted on the driver 400a. The sprag body 310a is rotatably coupled to the driver 400a through a hinge, and rotated in the clockwise direction or counterclockwise direction according to whether an electromagnetic force is applied to the driver 400a.

The locking groove 320a is concavely formed in a V-shape on one side (top side in FIG. 1) of the sprag body 310a, and has a size to seat the locking pin 221a of the detent lever body 220a therein. The locking groove 320a is formed on the moving path of the locking pin 221a of the detent lever body 220a.

The locking groove 320a is concavely formed in a V-shape, such that the locking pin 221a is easily seated in/separated from the locking groove 320a. In the present embodiment, the locking groove 320a may be formed in a mountain shape with a slope formed only on one side thereof, in addition to the V-shape. Thus, the locking pin 221a can be seated in the locking groove 320a.

The driver 400a is contacted with the sprag 300a, and transfers rotational power to the sprag 300a. In the present embodiment, the driver 400a is configured as a solenoid. When an electromagnetic force is applied to the driver 400a, the driver 400a rotates the sprag 300a in the clockwise direction or the counterclockwise direction.

Next, the operation of the parking apparatus for a vehicle in accordance with the first embodiment of the present disclosure will be described.

Referring to FIG. 2, hydraulic pressure for releasing the P position is introduced into the piston 100a. The piston 100a is moved to the right (based on FIG. 2) by the introduction of the hydraulic pressure. As the piston 100a is moved, the detent lever contact part 210a is contacted with the piston 100a and rotated in the counterclockwise direction.

The locking pin 221a of the detent lever body 220a is locked to the locking groove 320a of the sprag 300a. Furthermore, the N position (Non-P position) may be maintained against the detent spring 230a, as the locking pin 221a of the detent lever body 220a is locked to the locking groove 320a of the sprag 300a.

That is, when the engine is stopped during the N position, the supply of the P-position releasing hydraulic pressure to the piston 100a is stopped. As described above, however, the locking pin 221a of the detent lever body 220a may be locked to the locking groove 320a of the sprag 300a, and the N position (Non-P position) may be maintained against the detent spring 230a.

Referring to FIGS. 3 and 4, the supply of the P-position releasing hydraulic pressure is stopped, and the detent lever body 220a is rotated in the clockwise direction by the elastic restoring force of the detent spring 230a, such that the gear shift position is shifted to the P position.

That is, when the gear shift position is to be shifted from the N stage to the P stage, the detent lever body 220a is rotated in the clockwise direction by the elastic restoring force of the detent spring 230a, and the locking pin 221a of the detent lever body 220a is separated from the locking groove 320a of the sprag 300a.

The detent lever body 220a is rotated in the clockwise direction by the elastic restoring force of the detent spring 230a, such that the gear shift position is shifted to the P position.

In accordance with the present embodiment, the sprag 300a may be disposed on the rotation path of the detent lever 200a, and receive rotational power from the driver 400a so as to restrict the rotation of the detent lever 200a.

Figure 5:
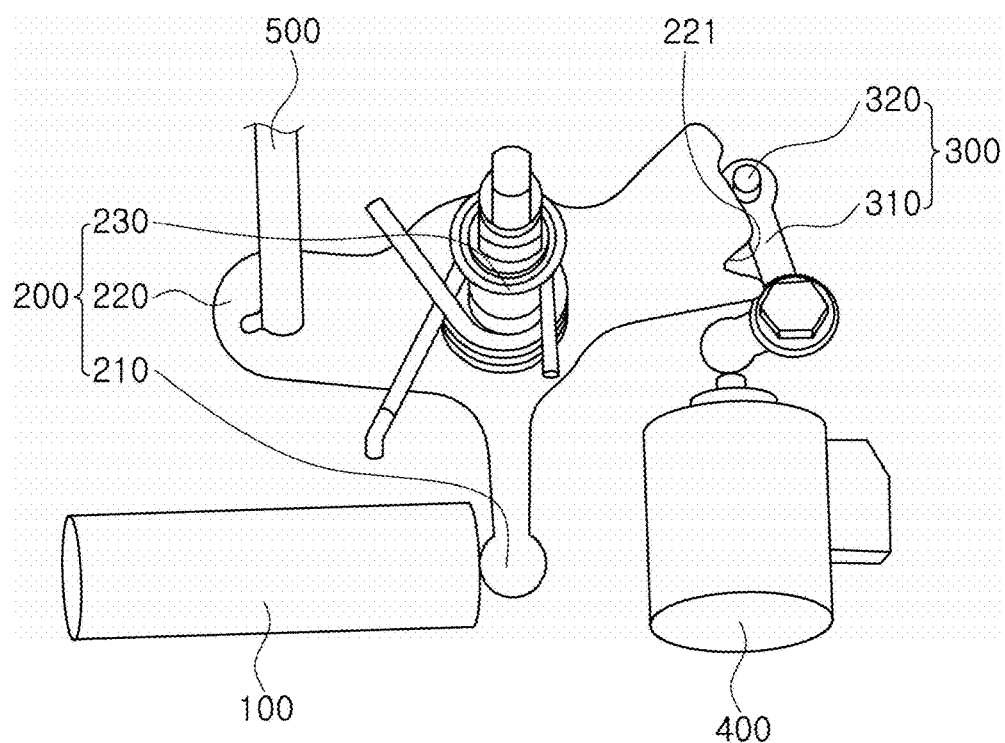
FIG. 5 is a conceptual view schematically illustrating a parking apparatus for a vehicle in accordance with a second embodiment of the present disclosure.
Figure 6:
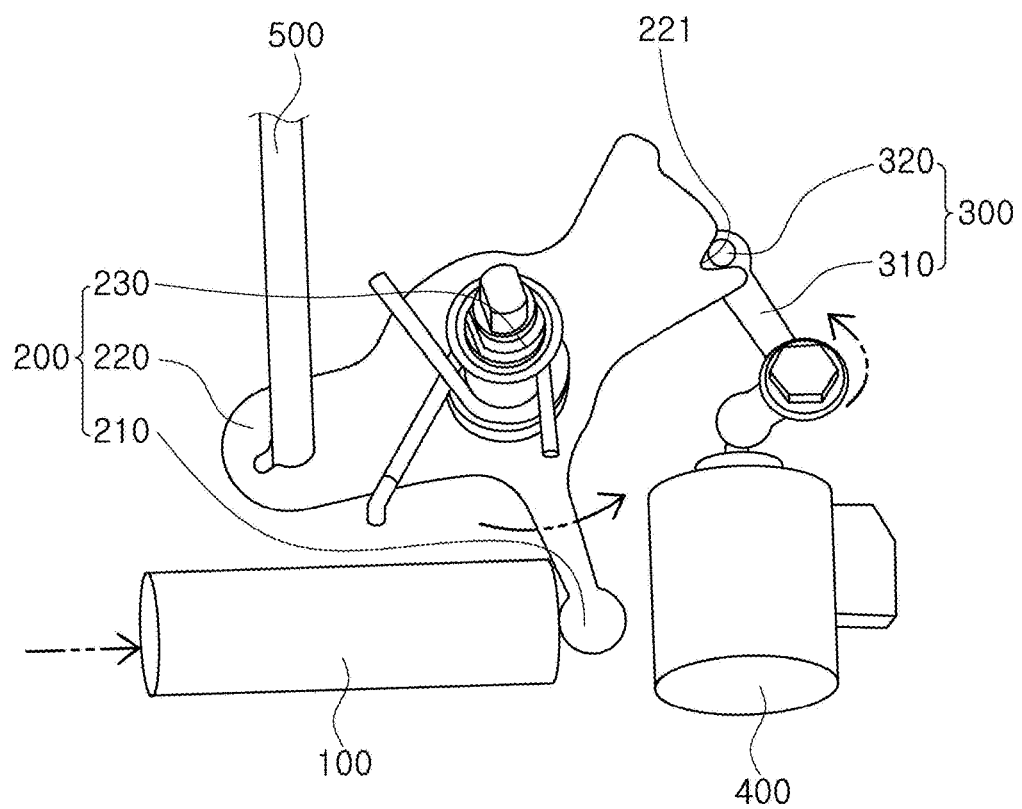
FIG. 6 is a conceptual view schematically illustrating that P-position releasing hydraulic pressure is applied in the parking apparatus for a vehicle in accordance with the second embodiment of the present disclosure.
Figure 7:
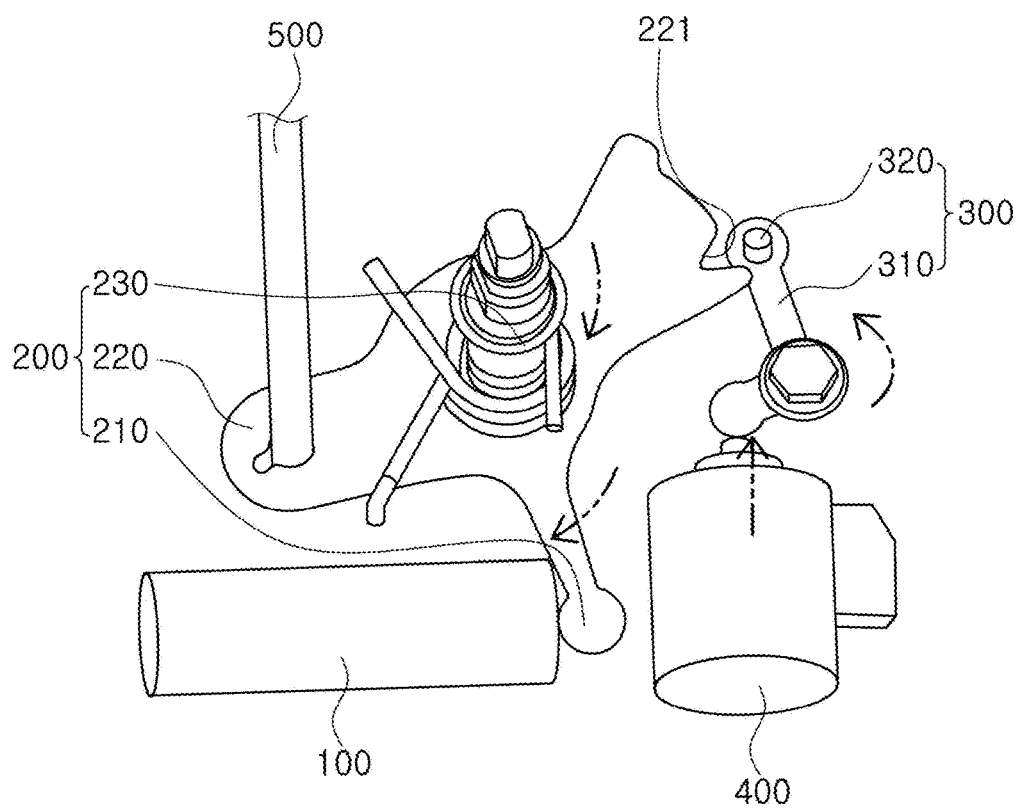
FIG. 7 is a conceptual view schematically illustrating an operation of the parking apparatus for a vehicle in accordance with the second embodiment of the present disclosure, when an electromagnetic force is applied to a driver.
Figure 8:
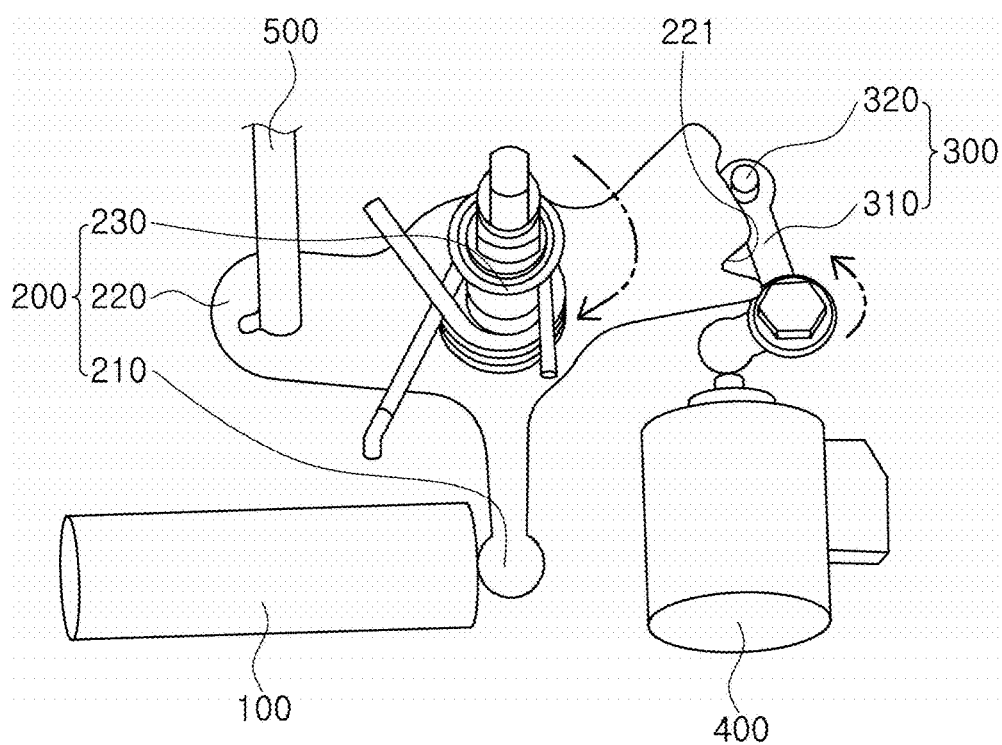
FIG. 8 is a conceptual view schematically illustrating that the electromagnetic force of the driver is released in the parking apparatus for a vehicle in accordance with the second embodiment of the present disclosure.

FIG. 5 is a conceptual view schematically illustrating a parking apparatus for a vehicle in accordance with a second embodiment of the present disclosure, FIG. 6 is a conceptual view schematically illustrating that P-position releasing hydraulic pressure is applied in the parking apparatus for a vehicle in accordance with the second embodiment of the present disclosure, FIG. 7 is a conceptual view schematically illustrating an operation of the parking apparatus for a vehicle in accordance with the second embodiment of the present disclosure, when an electromagnetic force is applied to a driver, and FIG. 8 is a conceptual view schematically illustrating that the electromagnetic force of the driver is released in the parking apparatus for a vehicle in accordance with the second embodiment of the present disclosure.

In accordance with the present disclosure, the locking pin 320 of the sprag 300 may be locked to the locking groove 221 of the detent lever 200, and thus inhibit the rotation of the detent lever 200 during driving of the vehicle, such that the gear shift position is not shifted to the P position.

In accordance with the present disclosure, the locking pin 221a of the detent lever 200a may be locked to the locking groove 320a of the sprag 300a, and thus inhibit the rotation of the detent lever 200a during driving of the vehicle, such that the gear shift position is not shifted to the P position.

Referring to FIGS. 5 to 8, the parking apparatus for a vehicle in accordance with the second embodiment of the present disclosure includes a piston 100, a detent lever 200, a sprag 300 and a driver 400.

The piston 100 is moved according to whether hydraulic pressure is introduced. The piston 100 is moved in one direction (to the right in FIG. 5) when hydraulic pressure is introduced, and moved in the other direction (to the left in FIG. 5) when the hydraulic pressure is released.

In the present embodiment, the detent lever 200 is rotated according to the movement of the piston 100, and a gear shift position is set to a P position or N position (Non-P position). Hereafter, the IN position includes Non-P positions which are not the P position. In the present embodiment, the gear shift position is set to the P position when the detent lever 200 is rotated in the clockwise direction, and set to the N position when the detent lever 200 is rotated in the counterclockwise direction.

In the present embodiment, the piston 100 is operated according to a hydraulic method. However, the present disclosure is not limited thereto, and the operation method of the piston 100 may be modified in various manners. For example, the piston 100 may be operated according to a pneumatic method.

The detent lever 200 is disposed on the moving path of the piston 100, and rotated in contact with the piston 100 by the movement of the piston 100. The detent lever 200 includes a detent lever contact part 210, a detent lever body 220 and a detent spring 230.

The detent lever contact part 210 is disposed on the moving path of the piston 100, and contacted with the piston 100 according to the movement of the piston 100. The detent lever contact part 210 is rotated by the contact with the piston 100.

That is, when the piston 100 is moved in one direction (to the right in FIG. 6) by introduction of hydraulic pressure, the detent lever contact part 210 is contacted with the piston 100. The detent lever contact part 210 is rotated in the counterclockwise direction (based on FIG. 6) according to the movement of the contacted piston 100.

When the piston 100 is moved in the other direction (to the left in FIG. 6) while the hydraulic pressure of the piston 100 is released, the detent lever contact part 210 is separated from the piston 100, and rotated in the clockwise direction (based on FIG. 6) by an elastic restoring force of the detent spring 230.

The detent lever body 220 is rotated in connection with the rotation of the detent lever contact part 210, and has a locking groove 221 formed on one side (right side in FIG. 5) thereof, such that the sprag 300 is locked to the locking groove 221.

A locking pin 320 of the sprag 300 is locked to the locking groove 221 of the detent lever body 220, such that the detent lever body 220 is restricted from rotating. As the locking pin 320, a bearing or the like may be applied to minimize a frictional force.

The locking groove 221 is concavely formed in a V-shape on one side (right side in FIG. 5) of the detent lever body 220, and has a size to seat the locking pin 320 of the sprag 300 therein. The locking groove 221 is formed on the moving path of the locking pin 320 of the sprag 300.

The locking groove 221 is concavely formed in a V-shape, such that the locking pin 320 is easily seated in/separated from the locking groove 221. In the present disclosure, the locking groove 221 may be formed in a mountain shape with a slope formed only on one side thereof, in addition to the V-shape. Thus, the locking pin 320 may be seated in the locking groove 221.

The detent spring 230 is compressed by the rotation of the detent lever body 220, and provides an elastic restoring force to the detent lever body 220.

The detent spring 230 may be coupled to the detent lever body 220, and formed in a coil spring or pin spring shape. The detent spring 230 is held on the detent lever body 220, and elastically supports the detent lever body 220 in the clockwise direction or counterclockwise direction. Thus, when the gear shift position is shifted to the P position, the detent spring 230 may assist the movement of the piston 100.

When the detent spring 230 is to be elastically restored, the locking pin 320 of the sprag 300 may be seated in the locking groove 221 of the detent lever body 220, such that the detent lever body 220 is more reliably fixed to the sprag 300. Therefore, the gear shift position may not be shifted to the P position, but remain at the N position.

In the present embodiment, the detent lever body 220 is contacted with the piston 100 by the detent lever contact part 210 formed on one side (bottom side in FIG. 5) thereof, and the other side (top side in FIG. 5) thereof is coupled to a gear shifting operation part 500. Thus, the detent lever body 220 may be rotated in connection with the movement of the piston 100, and transfer power to the gear shifting operation part 500.

The sprag 300 is rotatably coupled to a vehicle body (not illustrated), disposed on the rotation path of the detent lever 200, and locked to the detent lever 200 so as to restrict the rotation of the detent lever 200.

The sprag 300 includes a sprag body 310 and the locking pin 320. The sprag body 310 is rotated by the driver 400. The sprag 300 is rotated when an electromagnetic force is applied to the driver 400, and formed in an L-shape so as to be easily contacted with the detent lever body 220 of the detent lever 200 by the rotation. The sprag body 310 is rotated in the clockwise direction or counterclockwise direction according to whether an electromagnetic force is applied to the driver 400.

The locking pin 320 is mounted on an end (upper end in FIG. 5) of the sprag body 310, and locked to the locking groove 221 of the detent lever body 220 to restrict the rotation of the detent lever body 220.

In the present embodiment, the sprag 300 is rotatably mounted on the driver 400. More specifically, the sprag body 310 of the sprag 300 is rotatably mounted on the driver 400a. The sprag body 310 is rotatably coupled to the driver 400 through a hinge, and rotated in the clockwise direction or counterclockwise direction according to whether an electromagnetic force is applied to the driver 400.

The driver 400 is contacted with the sprag 300, and transfers rotational power to the sprag 300. In the present embodiment, the driver 400 is configured as a solenoid. When an electromagnetic force is applied to the driver 400, the driver 400 rotates the sprag 300 in the clockwise direction or the counterclockwise direction.

Next, the operation of the parking apparatus for a vehicle in accordance with the second embodiment of the present disclosure will be described.

Referring to FIG. 6, hydraulic pressure for releasing the P position is introduced into the piston 100. The piston 100 is moved to the right (based on FIG. 6) by the introduction of the hydraulic pressure. As the piston 100 is moved, the detent lever contact part 210 is contacted with the piston 100 and rotated in the counterclockwise direction.

The locking pin 320 of the sprag 300 is locked to the locking groove 221 of the detent lever body 220. Furthermore, the N position (Non-P position) may be maintained against the detent spring 230, as the locking pin 320 of the sprag 300 is locked to the locking groove 221 of the detent lever body 220.

That is, when the engine is stopped during the N position, the supply of the P-position releasing hydraulic pressure to the piston 100 is stopped. As described above, however, the locking pin 320 of the sprag 300 may be locked to the locking groove 221 of the detent lever body 220, and the N position (Non-P position) may be maintained against the detent spring 230.

Referring to FIGS. 7 and 8, the sprag 300 is rotated when an electromagnetic force is applied to the driver 400 at the N position (Non-P position). The locking pin 320 of the sprag 300 is separated from the locking groove 221 of the detent lever body 220.

As the supply of the P-position releasing hydraulic pressure is stopped, the detent lever body 220 is rotated in the clockwise direction by the elastic restoring force of the detent spring 230, such that the gear shift position is set to the P position.

That is, when the gear shift position is to be shifted from the N position to the P position, the sprag 300 is rotated by the driver 400, and the locking pin 320 of the sprag 300 is separated from the locking groove 221 of the detent lever body 220.

The detent lever body 220 is rotated in the clockwise direction by the elastic restoring force of the detent spring 230, such that the gear shift position is shifted to the P position.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A parking apparatus for a vehicle having an engine; the parking apparatus having a P position and an N position, the parking apparatus comprising:
 a piston moved according to whether a P-position releasing hydraulic pressure is introduced;
 a detent lever rotated by the movement of the piston;
 a sprag disposed on a rotation path of the detent lever that can be locked to the detent lever so as to restrict the rotation of the detent lever; and
 a driver contacted with the sprag, and configured to transfer rotational power to the sprag;
 wherein the detent lever comprises:
  a detent lever contact part rotated by contact with the piston; and
  a detent lever body rotated in connection with the rotation of the detent lever contact part, and having a locking pin that is mounted on the detent lever body and that can be locked to the sprag so as to restrict the rotation of the detent lever body;
 wherein the rotation of the detent lever according to the P-position releasing hydraulic pressure releases the parking apparatus from the P-position to the N position;
 wherein when the engine is stopped during the N position, the P-Position releasing hydraulic pressure is stopped, the hydraulic pressure of the piston is released, and the detent lever contact part is separated from the piston; and
 wherein when the locking pin is locked to the sprag so as to restrict the rotation of the detent lever body, the N position can be maintained.

2. The parking apparatus of claim 1, wherein the detent lever further comprises a detent spring compressed by the rotation of the detent lever body, and configured to provide an elastic restoring force to the detent lever body,
 wherein the elastic restoring force is configured to restore the parking apparatus to the P position after the N position is maintained.

3. The parking apparatus of claim 1, wherein the sprag comprises:
 a sprag body rotated by the driver; and
 a locking groove formed in the sprag body, such that the locking pin may be locked to the locking groove so as to restrict the rotation of the detent lever body.

4. The parking apparatus of claim 3, wherein the locking groove is concavely formed in a V-shape, and has a size to seat the locking pin therein.

5. The parking apparatus of claim 1, wherein the sprag is rotatably mounted on the driver.

6. A parking apparatus for a vehicle having an engine; the parking apparatus having a P position and an N position, the parking apparatus comprising:
 a piston moved according to whether a P-position releasing hydraulic pressure is introduced;
 a detent lever rotated by the movement of the piston;
 a sprag disposed on a rotation path of the detent lever that can be locked to the detent lever so as to restrict the rotation of the detent lever; and
 a driver contacted with the sprag, and configured to transfer rotational power to the sprag;
 wherein the detent lever comprises:
  a detent lever contact part rotated by contact with the piston; and
  a detent lever body rotated in connection with the rotation of the detent lever contact part, and having a locking groove locked to the sprag that can be locked to the sprag so as to restrict the rotation of the detent lever body;
 wherein the rotation of the detent lever according to the P-position releasing hydraulic pressure releases the parking apparatus from the P-position to the N position;
 wherein when the engine is stopped during the N position, the P-Position releasing hydraulic pressure is stopped, the hydraulic pressure of the piston is released, and the detent lever contact part is separated from the piston; and
 wherein when the locking groove is locked to the sprag so as to restrict the rotation of the detent lever body, the N position can be maintained.

7. The parking apparatus of claim 6, wherein the detent lever further comprises a detent spring compressed by the rotation of the detent lever body, and configured to provide an elastic restoring force to the detent lever body,
 wherein the elastic restoring force is configured to restore the parking apparatus to the P position after the N position is maintained.

8. The parking apparatus of claim 6, wherein the sprag comprises:
 a sprag body rotated by the driver; and
 a locking pin mounted on an end of the sprag body which may be locked to the locking groove so as to restrict the rotation of the detent lever body.

9. The parking apparatus of claim 8, wherein the locking groove is concavely formed in a V-shape, and has a size to seat the locking pin therein.

* * * * *